United States Patent
Ishisako

(10) Patent No.: US 10,609,895 B2
(45) Date of Patent: Apr. 7, 2020

(54) PET FENCE

(71) Applicant: NIHON IKUJI CO., LTD., Osaka-shi, Osaka (JP)

(72) Inventor: Ritsusou Ishisako, Nishinomiya (JP)

(73) Assignee: NIHON IKUJI CO., LTD., Osaka-Shi, Osaka (JP)

( * ) Notice: Subject to any disclaimer, the term of this patent is extended or adjusted under 35 U.S.C. 154(b) by 210 days.

(21) Appl. No.: 15/771,067

(22) PCT Filed: Sep. 1, 2017

(86) PCT No.: PCT/JP2017/031606
§ 371 (c)(1),
(2) Date: Apr. 25, 2018

(87) PCT Pub. No.: WO2019/043911
PCT Pub. Date: Mar. 7, 2019

(65) Prior Publication Data
US 2020/0045930 A1    Feb. 13, 2020

(51) Int. Cl.
*A01K 1/00*    (2006.01)
*A01K 1/03*    (2006.01)
*E04H 17/18*   (2006.01)

(52) U.S. Cl.
CPC .............. *A01K 1/03* (2013.01); *E04H 17/18* (2013.01)

(58) Field of Classification Search
CPC ... A01K 1/00; A01K 1/03; A01K 1/02; A01K 1/0209; A01K 1/0035; A01K 1/0041
USPC .................... 119/502, 504, 512–514
See application file for complete search history.

(56) References Cited

U.S. PATENT DOCUMENTS

| | | | | |
|---|---|---|---|---|
| 1,251,926 A | * | 1/1918 | schlesinger | E04H 17/16 256/24 |
| 1,569,624 A | * | 1/1926 | Erickson | A01M 25/004 43/107 |
| 1,603,816 A | * | 10/1926 | Stromborg | A01K 31/22 119/513 |
| 4,322,925 A | * | 4/1982 | Geisler, Jr. | A01K 1/0035 119/482 |
| 4,928,929 A | * | 5/1990 | Kinder | E04G 21/3204 256/19 |

(Continued)

FOREIGN PATENT DOCUMENTS

JP    2016116457 A    6/2016

OTHER PUBLICATIONS

"Washable and Portable Baby Circle," Press Release Distribution Service, @Press Website, Available Online at https://www.atpress.ne.jp/news/134510, Aug. 1, 2017, 9 pages. (Submitted with Machine Translation).

(Continued)

*Primary Examiner* — Richard T Price, Jr.
(74) *Attorney, Agent, or Firm* — Alleman Hall Creasman & Tuttle LLP

(57) ABSTRACT

A pet fence according to one aspect of the present invention includes: a plurality of vertical frames arranged in an annular shape and inclined toward an inner side; a side surface sheet including a mesh portion and stretched so as to extend between the adjacent vertical frames; and a non-stretchable bottom surface sheet located at a bottom surface of the pet fence. Lower end portions of the vertical frames are restricted from moving toward an outer side by being fixed to the non-stretchable bottom surface sheet.

4 Claims, 3 Drawing Sheets

(56) References Cited

U.S. PATENT DOCUMENTS

| | | | | | |
|---|---|---|---|---|---|
| 5,063,876 | A | * | 11/1991 | Harris | A01K 3/00 |
| | | | | | 119/513 |
| 5,732,935 | A | * | 3/1998 | Codario, Jr. | E01F 7/025 |
| | | | | | 256/1 |
| 7,334,778 | B2 | * | 2/2008 | Alberts | A01K 3/00 |
| | | | | | 119/512 |
| 7,380,379 | B2 | * | 6/2008 | Venegas, Jr. | E04H 9/10 |
| | | | | | 256/73 |
| 8,387,955 | B2 | * | 3/2013 | Ptacek | E04H 17/163 |
| | | | | | 256/24 |
| 8,573,565 | B1 | * | 11/2013 | Lyndaker | A63B 71/0054 |
| | | | | | 256/23 |

OTHER PUBLICATIONS

"Washable and Portable Baby Circle," Facebook page of Nihon Ikuji Co., LTD., Available Online at https://ja-jp.facebook.com/nihonikuji/posts/1756674317694461, Aug. 9, 2017, 2 pages. (Submitted with Machine Translation).

"Washable and Portable Baby Circle," Nihon Ikuji Co., LTD. Website, Available Online at http://www.nihonikuji.co.jp/item/araetetatameru_circle.html, Aug. 9, 2017, 31 pages. (Submitted with Machine Translation).

* cited by examiner

PET FENCE

TECHNICAL FIELD

The present invention relates to a pet fence configured to restrict movements of pets such as dogs.

BACKGROUND ART

A typical pet fence is configured by coupling a plurality of panels in an annular shape (see PTL 1, for example).

CITATION LIST

Patent Literature

PTL 1: Japanese Laid-Open Patent Application Publication No. 2016-116457

SUMMARY OF INVENTION

Technical Problem

Instead of configuring the pet fence by the panels, it can be thought that: the pet fence is configured by stretching a mesh sheet on a framework constituted by an upper frame, a lower frame, and a vertical frame; and this realizes weight reduction of the pet fence. However, further weight reduction is desired in consideration of carrying and putting away. On the other hand, if the weight reduction of the pet fence further proceeds, a pet may push a side surface of the pet fence from an inner side, and the entire pet fence may fall.

The present invention was made under these circumstances, and an object of the present invention is to provide a pet fence which is lightweight and hardly falls.

Solution to Problem

A pet fence according to one aspect of the present invention includes: a plurality of vertical frames arranged in an annular shape and inclined toward an inner side; a side surface sheet including a mesh portion and stretched so as to extend between the adjacent vertical frames; and a non-stretchable bottom surface sheet located at a bottom surface of the pet fence, wherein lower end portions of the vertical frames are restricted from moving toward an outer side by being fixed to the non-stretchable bottom surface sheet.

According to this configuration, the vertical frames are inclined toward the inner side. Therefore, even if a pet pushes the side surface sheet from the inner side, the pet fence hardly falls. Further, the movements of the lower end portions of the vertical frames toward the outer side are restricted by the non-stretchable bottom surface sheet. Therefore, even though the pet fence does not include a lower frame, the entire shape of the pet fence can be maintained, and further weight reduction of the pet fence can be realized.

The above pet fence may further include a plurality of grounding members each having a circular shape and configured to receive the corresponding vertical frame, wherein each of the vertical frames may be fixed to a portion of the corresponding grounding member which portion is displaced toward the inner side from a center of the grounding member.

According to this configuration, an inner-side portion of the grounding member which portion is located at the inner side of the center of the grounding member is prevented from floating from a floor when force is applied from the vertical frame to the grounding member. As a result, the entire grounding member is brought into contact with the floor and hardly slips, so that the lower end portions of the vertical frames can be prevented from moving toward the outer side.

The above pet fence may further include a first coupling member and a second coupling member each coupling the adjacent vertical frames, wherein: the first coupling member may include a first end connected to an upper end portion of one of the adjacent vertical frames so as to be turnable and a second end connected to the other of the adjacent vertical frames so as to be movable in an upward/downward direction; and the second coupling member may include a first end connected to an upper end portion of the other of the adjacent vertical frames so as to be turnable and a second end connected to the one of the adjacent vertical frames so as to be movable in the upward/downward direction.

According to this configuration, the second end of the first coupling member and the second end of the second coupling member move in the upward/downward direction along the vertical frames. With this, the first coupling member and the second coupling member can turn, and thus, the pet fence can be folded. Especially, since the above pet fence does not include the lower frame, the pet fence can be folded small.

In the above pet fence, the side surface sheet and the bottom surface sheet may be integrally formed and be configured to be detachable from the vertical frames.

According to this configuration, the side surface sheet and the bottom surface sheet are detachable from the vertical frames and washable. Therefore, the pet fence can be kept clean.

Advantageous Effects of Invention

According to the above configuration, a pet fence that is lightweight and hardly falls can be provided.

DESCRIPTION OF EMBODIMENTS

Hereinafter, an embodiment of the present invention will be explained in reference to the drawings. In the following explanation and the drawings, the same reference signs are used for the same or corresponding components, and a repetition of the same explanation is avoided.

Figure 1:
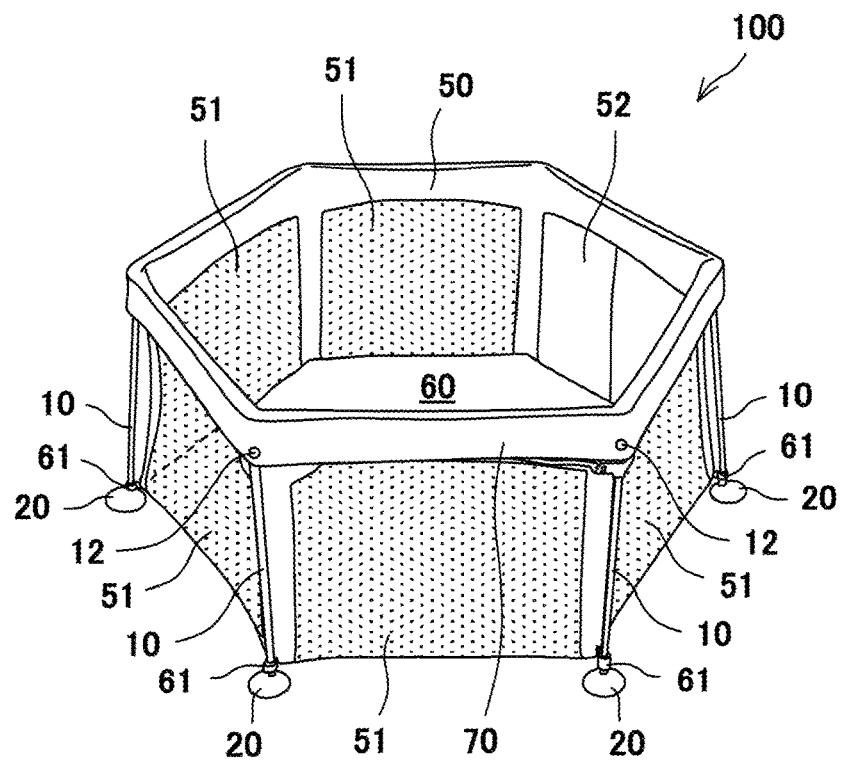
FIG. 1 is a perspective view of a pet fence.
Figure 2:
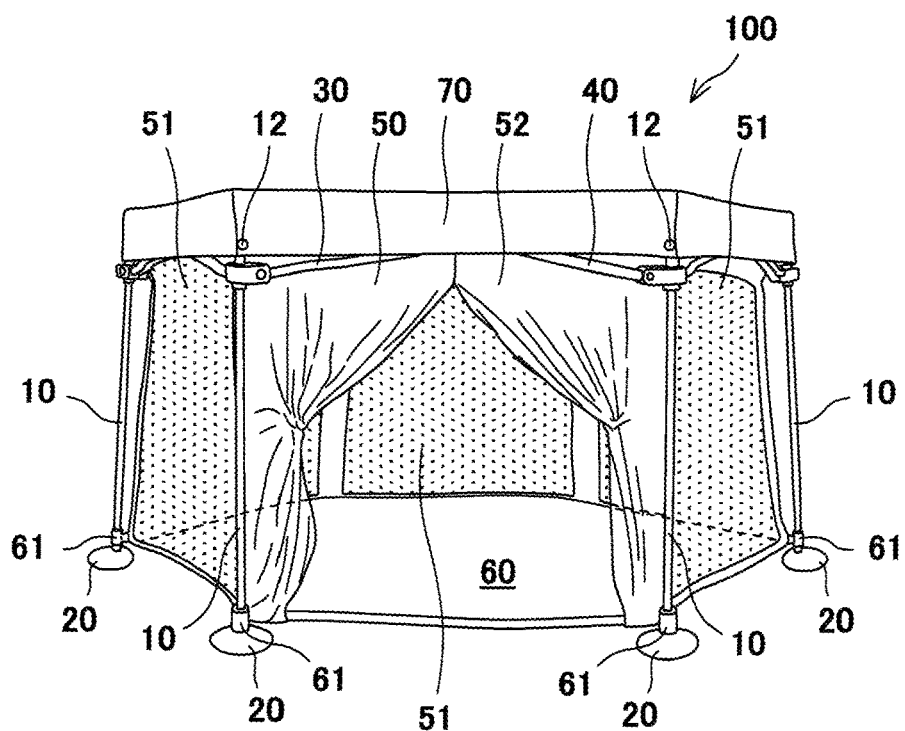
FIG. 2 is a side view of the pet fence.
Figure 3:
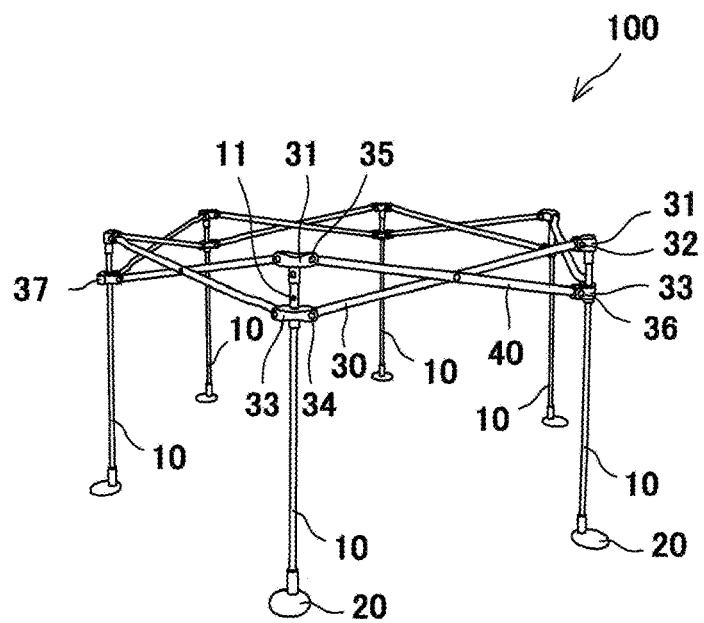
FIG. 3 is a diagram showing a framework of the pet fence.

FIG. 1 is a perspective view of a pet fence 100. FIG. 2 is a side view of the pet fence 100. FIG. 3 is a diagram showing a framework of the pet fence 100.

As shown in FIGS. 1 to 3, the pet fence 100 according to the present embodiment includes vertical frames 10, grounding members 20, first coupling members 30, second coupling members 40, a side surface sheet 50, a bottom surface sheet 60, and an upper cover 70. Hereinafter, these components will be explained in order.

Each of the vertical frames 10 is a member extending in a substantially vertical direction. The pet fence 100 according to the present embodiment includes six vertical frames 10, and these vertical frames are arranged in an annular shape. Specifically, the vertical frames 10 are arranged at respective positions corresponding to apexes of a regular hexagon in a plan view. However, the number of vertical frames 10 is not limited to six and may be larger or smaller than six. As shown in FIG. 3, a concave portion 11 of a snap button constituted by the concave portion 11 and a convex portion 12 is provided at an upper portion of each vertical frame 10. The convex portion 12 of the snap button is provided at the upper cover 70.

Hereinafter, a side close to a center of an area surrounded by the vertical frames 10 is referred to as an "inner side," and a side far from the center of the area surrounded by the vertical frames 10 is referred to as an "outer side." In this case, the vertical frames 10 are slightly inclined toward the inner side. To be specific, an upper end portion of each of the vertical frames 10 is located at the inner side of a lower end portion thereof. Since the vertical frames 10 are inclined toward the inner side as above, a side surface of the pet fence 100 is inclined toward the inner side, and therefore, the pet fence 100 hardly falls. Further, since the vertical frames 10 are inclined toward the inner side, force of spreading toward the outer side acts on the lower end portions of the vertical frames 10. However, by the below-described non-stretchable bottom surface sheet 60, the lower end portions of the vertical frames 10 are prevented from spreading toward the outer side. This will be described later.

Each of the grounding members 20 is a member configured to receive the vertical frame 10. In the present embodiment, the grounding members 20 are provided at the respective lower end portions of all of the vertical frames 10. The grounding member 20 has a circular shape in a plan view. A lower surface of the grounding member 20 is horizontal, and an upper surface of the grounding member is a curved surface that is convex upward. Further, the vertical frame 10 is fixed to a portion of the grounding member which portion is not located at a center of the grounding member 20 but is displaced toward the inner side from the center of the grounding member 20.

As described above, the vertical frames 10 are inclined toward the inner side. Therefore, if the vertical frame 10 is fixed to the center of the grounding member 20, an inner-side portion of the grounding member 20 may float when force is applied from the vertical frame 10 to the grounding member 20. However, in the present embodiment, since the vertical frame 10 is fixed to the portion displaced toward the inner side from the center of the grounding member 20, floating of the grounding member 20 can be suppressed, and the entire grounding member 20 can be brought into contact with a floor. As a result, the grounding member 20 hardly slips, and thus, the lower end portions of the vertical frames 10 can be prevented from moving toward the outer side.

Each of the first coupling members 30 and the second coupling members 40 is a member coupling the adjacent vertical frames 10. As shown in FIG. 3, the first coupling member 30 is located at the inner side of the second coupling member 40, and the second coupling member 40 is located at the outer side of the first coupling member 30. A longitudinal direction middle of the first coupling member 30 and a longitudinal direction middle of the second coupling member 40 are connected to each other so as to be turnable relative to each other. Hereinafter, a right side when viewing the pet fence 100 from the outer side is simply referred to as a "right side," and a left side when viewing the pet fence 100 from the outer side is simply referred to as a "left side." Further, the following explanation will focus on a specific set of the first coupling member 30 and the second coupling member 40 and the vertical frames 10 located at the respective left and right sides of the specific set of the first coupling member 30 and the second coupling member 40. For example, the "right-side vertical frame 10" denotes the right-side vertical frame 10 out of the left-side and right-side vertical frames 10 coupled by the first coupling member 30 and the second coupling member 40 to be explained herein.

A right end of the first coupling member 30 is connected to an upper end portion of the right-side vertical frame 10 so as to be turnable. Specifically, a fixing support member 31 is provided at the upper end portion of the right-side vertical frame 10, and the right end of the first coupling member 30 is connected to the fixing support member 31. The fixing support member 31 includes a first fixing support shaft 32 extending in a direction perpendicular to a flat plane including the left-side and right-side vertical frames 10, and the right end of the first coupling member 30 is supported by the first fixing support shaft 32 so as to be turnable. With this, the first coupling member 30 turns about the first fixing support shaft 32 as a turning center.

A left end of the first coupling member 30 is connected to the left-side vertical frame 10 so as to be movable in an upward/downward direction. Specifically, a moving support member 33 configured to move along the left-side vertical frame 10 is provided at the left-side vertical frame 10, and the left end of the first coupling member 30 is connected to the moving support member 33. The moving support member 33 includes a first moving support shaft 34 extending in a direction perpendicular to the flat plane including the left-side and right-side vertical frames 10, and the left end of the first coupling member 30 is supported by the first moving support shaft 34 so as to be turnable. With this, the left end of the first coupling member 30 moves along the left-side vertical frame 10 in the upward/downward direction.

A left end of the second coupling member 40 is connected to an upper end portion of the left-side vertical frame 10 so as to be turnable. Specifically, the fixing support member 31 is provided at the upper end portion of the left-side vertical frame 10, and the left end of the second coupling member 40 is connected to the fixing support member 31. The fixing support member 31 includes a second fixing support shaft 35 extending in a direction perpendicular to the flat plane including the left-side and right-side vertical frames 10, and the left end of the second coupling member 40 is supported by the second fixing support shaft 35 so as to be turnable. With this, the second coupling member 40 turns about the second fixing support shaft 35 as a turning center.

A right end of the second coupling member 40 is connected to the right-side vertical frame 10 so as to be movable in the upward/downward direction. Specifically, the moving support member 33 configured to move along the vertical frame 10 is provided at the right-side vertical frame 10, and the right end of the second coupling member 40 is connected to the moving support member 33. The moving support member 33 includes a second moving support shaft 36 extending in a direction perpendicular to the flat plane including the left-side and right-side vertical frames 10, and the left end of the second coupling member 40 is supported by the second moving support shaft 36 so as to be turnable. With this, the right end of the second coupling member 40 moves along the right-side vertical frame 10 in the upward/downward direction.

To prevent the first coupling member 30 and the second coupling member 40 from interfering with each other, a portion of the first coupling member 30 which portion includes the longitudinal direction middle is bent so as to be convex toward the inner side, and a portion of the second coupling member 40 which portion includes the longitudinal direction middle is bent so as to be convex toward the outer side. As shown in FIG. 3, the above-described concave portion 11 of the snap button is located under the fixing support member 31, and the moving support member 33 is located under the concave portion 11.

Figure 4:
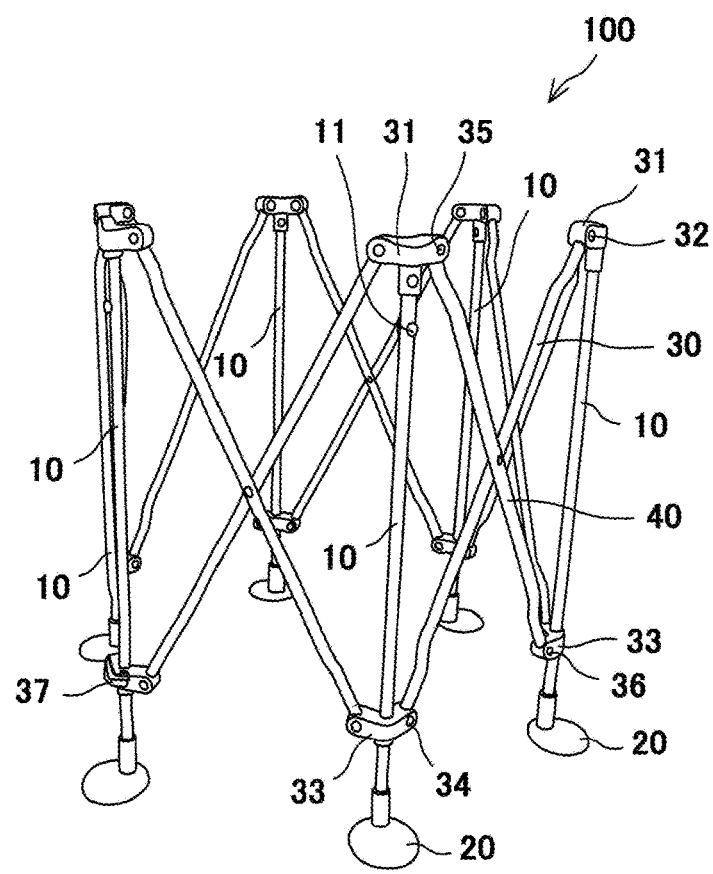
FIG. 4 is a diagram showing the framework of the pet fence when the pet fence is in the middle of being folded.
Figure 5:
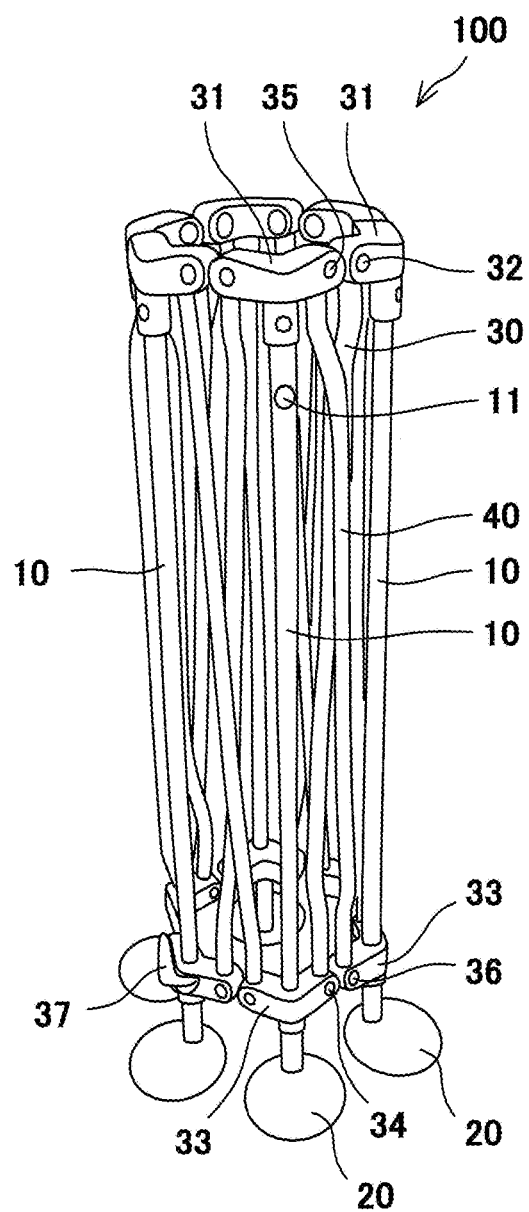
FIG. 5 is a diagram showing the framework of the pet fence when the pet fence is in a folded state.

FIG. 4 is a diagram showing the framework of the pet fence 100 when the pet fence 100 is in the middle of being folded. FIG. 5 is a diagram showing the framework of the pet fence 100 when the pet fence 100 is in a folded state. As shown in FIGS. 3 to 5, when the moving support members 33 move downward, the first coupling member 30 and the second coupling member 40 turn, and with this, the adjacent vertical frames 10 move close to each other. Thus, the pet fence 100 can be folded. It should be noted that each of the moving support members 33 includes a switching portion 37 configured to switch between a state where the moving support member 33 is movable and a state where the moving support member 33 is not movable. To be specific, the moving support member 33 includes the switching portion 37 serving as a lock mechanism.

As described above, the pet fence 100 according to the present embodiment is configured to be foldable. Since the pet fence 100 according to the present embodiment does not include a lower frame, the pet fence 100 can be folded extremely small. It should be noted that FIGS. 3 to 5 show only the framework of the pet fence 100. However, even when the side surface sheet 50 and the like are attached to the vertical frames 10, the pet fence 100 is foldable.

The side surface sheet 50 is a sheet forming the side surface of the pet fence 100. The side surface sheet 50 is formed in an annular shape and a band shape. The side surface sheet 50 is located at the inner side of the vertical frames 10 and is stretched so as to extend between the adjacent vertical frames 10. The side surface sheet 50 includes a plurality of rectangular mesh portions 51 formed by mesh fabric. In the present embodiment, there are six inter-frame areas that are areas each located between the adjacent vertical frames 10, and the mesh portions 51 are arranged at respective positions corresponding to five out of the six inter-frame areas.

The side surface sheet 50 includes an opening surface 52, and the opening surface 52 is arranged at a position corresponding to the remaining one inter-frame area. As shown in FIG. 2, the opening surface 52 is configured to be openable and closable by a fastener. When the opening surface 52 is in an open state, a pet can go in and out of the pet fence 100 through the opening surface 52. The pet fence 100 of the present embodiment does not include the lower frame, so that when the pet goes in and out, the pet does not stumble on the lower frame. Further, even when the pet runs along the side surface sheet 50 in the pet fence 100, the pet does not get hurt by stepping on the lower frame.

The bottom surface sheet 60 is a non-stretchable sheet located at a bottom surface of the pet fence 100. The shape of the bottom surface sheet 60 in a plan view is a regular hexagon, and an outer peripheral edge of the bottom surface sheet 60 is directly connected to a lower edge of the side surface sheet 50. Further, portions of the bottom surface sheet 60 which portions correspond to respective apexes of the regular hexagon are fixed to respective lower end portions of the vertical frames 10 through respective connecting tapes 61. It should be noted that the connecting tapes 61 are configured to be detachable from the vertical frames 10. Therefore, the bottom surface sheet 60 is detachable from the vertical frames 10.

As described above, since the vertical frames 10 are inclined toward the inner side, force toward the outer side acts on the lower end portions of the vertical frames 10. In addition, since the pet fence 100 of the present embodiment does not include the lower frame, spreading of the lower end portions of the vertical frames 10 toward the outer side cannot be suppressed by the lower frame. However, in the pet fence 100 according to the present embodiment, since the lower end portions of the vertical frames 10 are connected to one another by the non-stretchable bottom surface sheet 60, movements of the lower end portions of the vertical frames 10 toward the outer side are restricted. As a result, although the pet fence 100 does not include the lower frame, the lower end portions of the vertical frames 10 do not move toward the outer side, and the entire shape of the pet fence 100 can be maintained.

The upper cover 70 is a cover located at the outer side and upper side of the vertical frames 10. The upper cover 70 includes: an outer surface portion 71 covering the first coupling members 30 and the second coupling members 40 from the outer side and formed in a band shape; and an upper surface portion 72 extending from an upper end of the outer surface portion 71 toward the inner side of the pet fence 100 and forming a circular opening portion. Since the pet fence 100 according to the present embodiment is provided with the upper surface portion 72, the pet can be prevented from jumping out to an outside. Further, the upper cover 70 is connected to an upper edge portion of the side surface sheet 50. Therefore, the side surface sheet 50, the bottom surface sheet 60, and the upper cover 70 are formed integrally. As described above, the outer surface portion 71 of the upper cover 70 is provided with the convex portions 12 of the snap buttons corresponding to the concave portions 11 provided at the vertical frames 10. With this, the upper cover 70 is attachable to and detachable from the vertical frames 10 through the snap buttons.

As described above, the side surface sheet 50, the bottom surface sheet 60, and the upper cover 70 are formed integrally, and all of these are detachably attached to the vertical frames 10. Therefore, according to the present embodiment, the side surface sheet 50, the bottom surface sheet 60, and the upper cover 70 are detachable from the vertical frames 10 and washable. Thus, the pet fence 100 can be kept clean.

LIST OF REFERENCE CHARACTERS 10 vertical frame
20 grounding member
30 first coupling member
40 second coupling member
50 side surface sheet
51 mesh portion
60 bottom surface sheet
70 upper cover
100 pet fence

The invention claimed is:
1. A pet fence comprising:
a plurality of vertical frames arranged in an annular shape and inclined toward an inner side;
a side surface sheet including a mesh portion and stretched so as to extend between the adjacent vertical frames; and
a non-stretchable bottom surface sheet located at a bottom surface of the pet fence, wherein
lower end portions of the vertical frames are restricted from moving toward an outer side by being fixed to the non-stretchable bottom surface sheet.

2. The pet fence according to claim 1, further comprising a plurality of grounding members each having a circular shape and configured to receive the corresponding vertical frame, wherein
   each of the vertical frames is fixed to a portion of the corresponding grounding member which portion is displaced toward the inner side from a center of the grounding member.

3. The pet fence according to claim 1, further comprising a first coupling member and a second coupling member each coupling the adjacent vertical frames, wherein:
   the first coupling member includes
      a first end connected to an upper end portion of one of the adjacent vertical frames so as to be turnable and
      a second end connected to the other of the adjacent vertical frames so as to be movable in an upward/downward direction; and
   the second coupling member includes
      a first end connected to an upper end portion of the other of the adjacent vertical frames so as to be turnable and
      a second end connected to the one of the adjacent vertical frames so as to be movable in the upward/downward direction.

4. The pet fence according to claim 1, wherein the side surface sheet and the bottom surface sheet are integrally formed and are configured to be detachable from the vertical frames.

* * * * *